2,6-DIMETHYLOCT-2-EN-1,8-DIAL AND PROCESS OF MANUFACTURE

Robert Robinson, Great Missenden, Renée Hermine Jaeger, Oxford, and Keith Jasper Clark, Egham, England, assignors to Shell Oil Company, a corporation of Delaware
No Drawing. Filed June 23, 1958, Ser. No. 744,016
2 Claims. (Cl. 260—601)

This invention relates to a novel method for the preparation of terpenoid compounds and more specifically relates to the preparation of iridomyrmecin which manifests high potency as an insecticide. The present invention also contemplates the preparation of novel terpenoid compounds, some of which are intermediates in the preparation of iridomyrmecin.

In La Ricerca Scientifica for September 1949, pages 1011 to 1017, and for December 1950, pages 1853 to 1855, Mario Pavan describes the isolation of a crystalline substance from the total extracts of the bodies of worker ants of the species *Iridomyrmex humilis* Mayr or Argentine ant. This substance was found to act on insects as a powerful contact poison and was named "iridomyrmecin." The chemical structure of this compound is not disclosed, however.

Other workers in this field have since deduced that iridomyrmecin has a chemical structure which can be represented by Formula I. The isolation of two further compounds, isoiridomyrmecin (II) and iridodial (III) from various Iridomyrmex species of ants has also been reported.

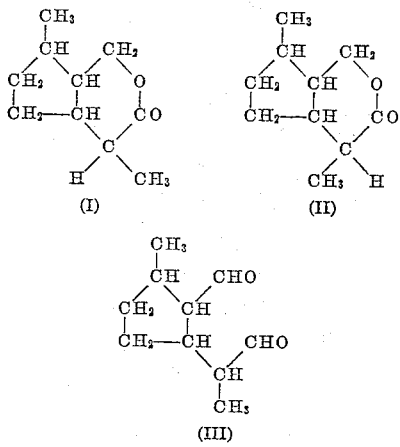

However, no one as yet has published a method of synthesizing these compounds or their stereoisomers. Such a method is now provided by the present invention.

The configurations of the naturally occurring iridomyrmecin, isoiridomyrmecin and iridodial correspond to that of *l*-citronellal. Since enantiomorphs are indistinguishable in their chemical behavior, the process of the invention can be applied to the synthesis of either the *l*- or *d*-series of compounds from the corresponding *l*- or *d*-starting materials. The following description of the process of the invention, and the structural formulae used to illustrate it, therefore, refer to either *l*- or *d*-compounds, or mixtures thereof, unless otherwise specified.

The present invention is concerned with a process for the preparation of an isoiridomyrmecin, having the structural formula

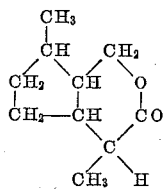

(IV)

which comprises treating 2,6-dimethyloct-2-en-1,8-dial of the structural formula

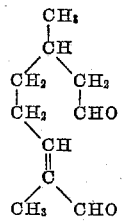

(XI)

with a catalytic amount, for example, about 2 to 6% by weight, based on the aldehyde, of an alkali metal alkoxide in an alcoholic medium, preferably sodium methoxide in methanol, to produce the lactone. Owing to the instability of the dialdehyde, any reaction mixtures in which it is present should preferably be maintained under an inert atmosphere, for example, under nitrogen. Advantageously, the sodium methoxide solution is added to a solution of the dialdehyde in methanol at room temperature, the mixture being allowed to stand for about a day at this temperature and then being heated under reflux for about 8 hours. The reaction mixture is then acidified, for example, with hydrochloric acid, preferably after being chilled. The resulting mixture may be poured into water or brine prior to extraction with a solvent, for example, ether, or the methanol may be removed prior to extraction by distillation, preferably under reduced pressure. Evaporation of the solvent from the extract leaves a brown oil which on distillation is obtained as a colorless, sweet smelling, mobile oil analyzing for the empirical formula $C_{10}H_{16}O_2$. Consistent with a δ-lactone structure, its infrared spectrum shows a single carbonyl peak at 5.76μ. Isoiridomyrmecin can be separated from the reaction mixture by converting it into the parent hydroxy acid, which is a solid, by treating the reaction mixture with warm aqueous alkali metal hydroxide solution and subsequently acidifying the chilled solution, preferably with an aqueous acetic acid solution, suitably containing 40 to 60% and preferably 50% by weight of acetic acid. The hydroxy acid thereby precipitated can be filtered off and reconverted to the lactone by treatment with an acid in an aqueous medium, for example, with 5-normal hydrochloric acid. The lactone can be extracted with a solvent, for example, ether, and then recrystallized from light petroleum when it is obtained as colorless prisms, M.P. 58.5°–59° C.

The conversion of the 2,6-dimethyloct-2-en-1,8-dial into the lactone by means of alkali metal alkoxide involves (1) an intramolecular Michael condensation, (2) an intramolecular Cannizzaro reaction, and (3) lactonization of the resulting δ-hydroxy acid.

Alternatively, and according to a modification of the above process, the 2,6-dimethyloct-2-en-1,8-dial (XI)

may be converted to the lactone by a two-stage process, in the first of which the aliphatic dial is converted to an alicyclic dial by treatment with a dilute aqueous solution of a weak acid, for example, acetic acid. An aqueous acetic acid solution containing 40 to 60%, preferably 50% by weight of the acid, has been found to give consistently good results and is therefore preferred. Advantageously, an aqueous solution containing a weak acid and a tertiary base, for example, pyridine, preferably in equivalent amounts, may be used. The alicyclic dial has the structural formula

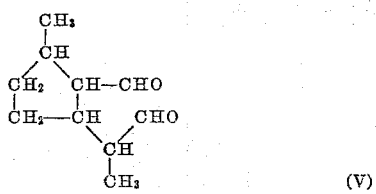

(V)

and is identical with the natural iridodial or is the enantiomorph, depending on whether the *l*- or *d*-series is being synthesized. In the second stage, the alicyclic dial (V) is warmed with an aqueous alkali metal hydroxide solution, suitably a normal solution of sodium hydroxide, preferably in an inert atmosphere, for example, of nitrogen, to produce the hydroxy carboxylic acid of structural formula

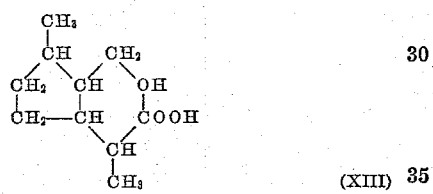

(XIII)

in the form of a solution of its alkali metal salt. Neutral impurities are preferably extracted with a solvent, for example, ether, and the aqueous layer chilled and carefully acidified with a mineral acid, for example, with 5-normal hydrochloric acid solution, to produce the lactone (IV).

The isoiridomyrmecin prepared by the process of the invention may, by a modification of this process, be converted to iridomyrmecin by treatment with an alkali metal hydroxide in aqueous or alcoholic solution.

According to a modification of the process of the invention, the aliphatic dial (XI), or the alicyclic dial (V), or a mixture thereof, may be derived from the alpha, beta-unsaturated aldehydoacetal, namely, 2,6-dimethyl-8,8-dialkoxyoct-2-en-1-al, which can be represented by the following structural formula

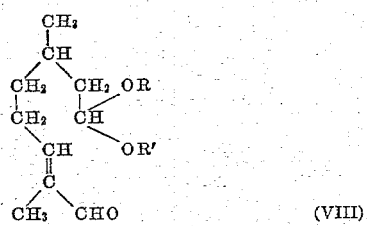

(VIII)

wherein R and R' each represent an alkyl group or are linked to form an ethylene group, by treating it with a dilute aqueous solution of a weak acid, for example, suitably containing 40 to 60%, and preferably 50% by weight of acetic acid. The treatment is preferably effected by heating the mixture under reflux. Owing to the instability of the dialdehydes, the treatment is preferably carried out in an inert atmosphere, for example, of nitrogen. After heating for about one hour in this manner, the reaction product consists mainly of the aliphatic dialdehyde (XI) which can be isolated by extracting the aqueous diluted mixture with a solvent, for example, ether. On distillation under reduced pressure, the dialdehyde can be obtained as an almost colorless sweet smelling liquid, B.P. 90° to 95° C. under 0.5 millimeter pressure. Its infrared spectrum shows two peaks in the carbonyl region at $5.80\mu$ and $5.92\mu$, indicating that both saturated and unsaturated aldehyde groups are present.

By increasing the treatment time to about two hours if desired, also adding a tertiary base such as pyridine to the aqueous acid solution as hereinbefore described, and working up the reaction mixture in a similar way, a mixture of the aliphatic dialdehyde (XI) and the alicyclic dialdehyde (V) in approximately equal parts by weight can be obtained, the latter forming the first main fraction, B.P. 78° to 82° C. under 0.4 millimeter pressure, on fractionally distilling the mixture under reduced pressure. The alicyclic dialdehyde is a pale yellow liquid with a characteristic sweet odor. The infrared spectrum shows slight absorption in the hydroxyl region, probably due to a tautomeric form of the dialdehyde, and peaks at $3.70\mu$ and $5.82\mu$ due to the presence of the unconjugated aldehyde groups. According as the alicyclic dialdehyde (V) has the laevo- or dextro-configuration, it is identical with iridodial (III) or its enantiomorph, respectively.

It was not found possible to increase the yield of the alicyclic dial (V) at the expense of the aliphatic dialdehyde (XI) which suggests that the alpha,beta-unsaturated aldehyde acetal (VIII) is a mixture of cis- and trans-isomers of which only one is susceptible to ring closure under the influence of weak acids.

According to a further modification of the process of the invention, the alpha,beta-unsaturated aldehydo-acetal (VIII) may be obtained by oxidizing an acetal of citronellal having the structural formula

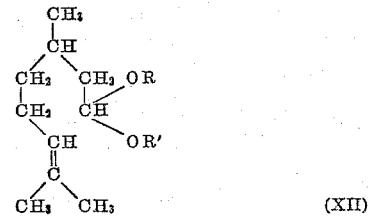

(XII)

wherein R and R' each represent an alkyl group or can be linked to form an ethylene group, with any oxidizing agent known to oxidize the group

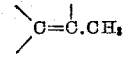

to the group

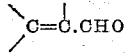

A particularly suitable agent for this purpose is selenium dioxide, the oxidation preferably being carried out in a solvent such as ethyl alcohol. The cyclic acetal obtained from citronellal and ethylene glycol is a particularly suitable acetal to use in this reaction, being smoothly converted into the aldehyde, and is therefore a preferred starting material. It is believed to be a novel compound. The aldehydo-acetal can be isolated by fractional distillation and, if necessary, purified by means of its sodium bisulfite addition compound. There was no evidence that the other possible oxidation product, the ketone of structural formula

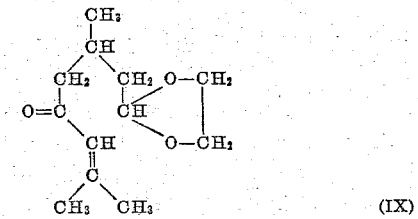

(IX)

was present in the reaction mixture. The infrared spectrum of the aldehydo-acetal shows the characteristic stretching frequency of an aldehyde C–H bond at $3.70\mu$ and has bands at 5.92μ and 6.10μ for a conjugated carbonyl group and double bond, respectively. Further proof for the constitution of this product is provided by the almost quantitative oxidation of the alpha,beta-unsaturated aldehydo-cyclic acetal to the acid (X) by alkaline silver oxide

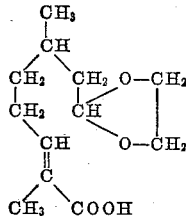 (X)

According to a further modification of the process of the invention, the aliphatic dialdehyde (XI) can also be obtained by oxidizing either the 2,6-dimethyloct-2-en-1,8-diol of structural Formula XV or the 2,6-dimethyl-8-hydroxyoct-2-en-1-al of structural Formula XVII

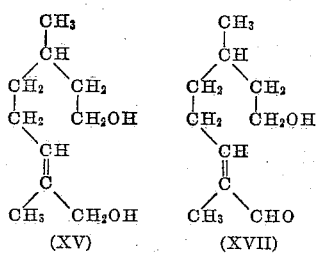

(XV)        (XVII)

by means of an agent known to oxidize primary alcohol groups to aldehyde groups without acting simultaneously on double bonds present in the alcohol molecule. A particularly suitable oxidizing agent for this purpose is chromium trioxide in pyridine.

According to a further modification of the process of the invention, the diol (XV) and the aldehydo-alcohol (XVII) can be obtained by hydrolyzing the corresponding esters, particularly the acetates. The diesters can be hydrolyzed with an aqueous or aqueous alcoholic solution of an alkali metal hydroxide, preferably potassium hydroxide. This reagent cannot, however, be used for the hydrolysis of the aldehydo ester and hydrolysis of this compound is best effected with a weak base, for example, ammonia, preferably as a saturated alcoholic solution.

According to a further extension of the process of the invention, the diester and aldehydo ester, which have the following structural formulae, respectively

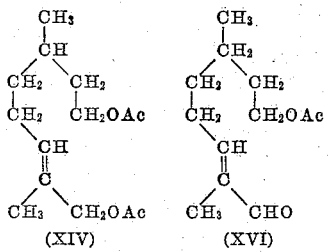

(XIV)       (XVI)

wherein Ac represents the radical of a carboxylic acid, preferably acetic acid, can be obtained by oxidizing citronellyl acetate or other citronellyl ester with an oxidizing agent known to oxidize the group

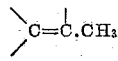

to the group

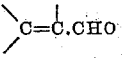

in order to convert the terminal methyl group of the citronellal moiety to an aldehyde group, or with an agent known to oxidize the group

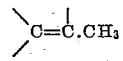

to the group

to convert a terminal methyl group of the citronellal moiety to an ester group. A particularly suitable oxidizing agent for use in these conversions is selenium dioxide. By effecting the oxidation of the citronellyl ester, preferably the acetate, with selenium dioxide in a neutral medium, preferably in an alcohol such as ethyl alcohol, the aldehydo ester (XVI) can be obtained. By effecting the oxidation of the citronellyl acetate with selenium dioxide in the presence of a carboxylic acid, or a mixture of a carboxylic acid and the acid anhydride, for example, glacial acetic acid or a mixture of glacial acetic acid and acetic anhydride, the diester (XIV) can be obtained.

According to a further modification of the press of the invention, the aldehyde alcohol (XVII) can also be obtained by oxidizing citronellol with an oxidizing agent known to oxidize the group

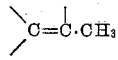

to the group

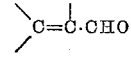

as mentioned above, selenium dioxide in a neutral reaction medium such as an alcohol being particularly suitable.

The stereoisomers having the structural Formulae XI, VII, VIII, XV, XVII, or carboxylic acid esters of the stereoisomers represented by Formulae XV and XVII d-iridodial, d-isoiridomyrmecin and d-iridomyrmecin are believed to the novel compounds.

By starting with levo-rotatory citronellol or a citronellyl ester or citronellal, according to the invention, it is thus possible to synthesize the naturally occurring iridomyrmecin, isoiridomyrmecin and iridodial. Conversely, by starting with dextro-rotatory citronellol, citronellyl ester or citronellal, the enantiomorphs of these compounds can be prepared.

The preparation of these compounds and of the various intermediates required for their production is illustrated in the following examples using the commercially available dextro-rotatory citronellol or its derivatives as starting materials. In these examples, parts by weight bear the same relation to parts by volume as the kilogram bears to the liter.

In these examples, the homogeneity of liquid products was confirmed by gas-liquid chromatography over a Celite column impregnated with 30% Silicone E-301. Infrared spectra of solids were determined for Nujol mulls. Unless otherwise indicated, light petroleum means the fraction of B.P. 40–60° C. Extracts were in general dried over anhydrous magnesium sulfate.

EXAMPLE I

*Preparation of d(+)-2,6-dimethyl-8,8-ethylenedioxyoct-2-ene (VII)*

A mixture of d(+)-citronellal (214 parts by weight), ethylene glycol (100 parts by volume), benzene (600 parts by volume) and toluene-p-sulfonic acid (approximately 0.1 part by weight) was refluxed for 12 hours under a Dean-Stark water separator. The solution was diluted with ether, washed with aqueous sodium hydrogen carbonate and water, dried and evaporated. Fractionation of the residue yielded the cyclic acetal of citronellal as a colorless liquid (190 parts by weight), B.P. 125–130° at 18 mm. pressure $[\alpha]_D^{22}$ +3.02° (homog.). (Found: C, 73.1; H, 11.1. $C_{12}H_{22}O_2$ requires C, 72.8; H, 11.1%.)

EXAMPLE II

*Preparation of d(+)-2,6-dimethyl-8,8-ethylenedioxyoct-2-en-1-al (VIII)*

Freshly sublimed selenium dioxide (34 parts by weight) dissolved in ethanol (200 parts by volume) was added over a period of 2 hours to a vigorously stirred solution of the above acetal (60 parts by weight) in ethanol (100 parts by volume), warmed at 50°. The bath temperature was then raised slowly to 95–100° and the mixture refluxed with stirring for 24 hours. The reaction mixture was left to cool, and after filtration the solvent was removed in vacuo. The residue was dissolved in ether, washed, dried and fractionally distilled. The fraction, B.P. 114–116°/0.2 mm. (32.6 parts by weight), was stirred for 6 hours with a solution of sodium sulfite heptahydrate (157 parts by weight) and sodium hydrogen carbonate (90 parts by weight) in water (900 parts by volume), and undissolved oil extracted with ether. The aqueous solution was cooled with ice, basified with 10% sodium hydroxide solution (ca. 450 parts by volume) and repeatedly extracted with ether. After washing and drying of the extract, the solvent was evaporated and d(+)-2,6-dimethyl-8,8-ethylenedioxyoct-2-en-1-al (23.85 parts by weight) obtained as a colorless oil which was sufficiently pure for use in the next stage. A sample distilled at B.P. 100–106°/0.1 mm. and had $[\alpha]_D^{17}$ +5.95° (homog.). (Found: C, 67.5; H, 9.7. $C_{12}H_{20}O_3$ requires C, 67.9; H, 9.4%.) The infrared spectrum had bands at 3.70 (aldehydic C—H), 5.92 (conjugated C=O) and 6.10μ (conjugated C=C).

EXAMPLE III

*Preparation of d(+)-2,6-dimethyloct-2-en-1,8-dial (XI)*

A solution of the cyclic acetal (VIII; 19 parts by weight) in 50% aqueous acetic acid (190 parts by volume) was heated in an oil bath under reflux under nitrogen for 1 hour, cooled rapidly and poured into brine. The mixture was extracted with ether and the extract repeatedly washed with water, dilute sodium hydrogen carbonate solution and more water, dried and evaporated. After distillation of the residue, the dialdehyde was obtained as an almost colorless, sweetly smelling liquid, B.P. 90–95°/0.5 mm.; freshly distilled material had $[\alpha]_D^{27}$ +7.68° (homog.) and after 3 days $[\alpha]_D^{26}$ +6.80°. (Found: C, 71.3; H, 9.8. $C_{10}H_{16}O_2$ requires C, 71.4; H, 9.5%.) The infrared spectrum showed peaks at 3.70 (aldehydic C—H), 5.80 (C=O), 5.92 (conjugated C=O) and 6.10μ (conjugated C=C).

The bis-2,4-dinitrophenylhydrazone separated from chloroformethanol as a brick-red, crystalline powder, M.P. 209–210°. (Found: C, 50.1; H, 4.4; N, 21.4. $C_{22}H_{24}O_8N_8$ requires C, 50.0; H, 4.5; N, 21.2%.)

The bis-semicarbazone crystallized from ethanol as colorless prisms, M.P. 219° (decomp.). (Found: C, 50.9; H, 7.9; N, 30.1. $C_{12}H_{22}O_2N_6$ requires C, 51.0; H, 7.8; N, 29.8%.)

EXAMPLE IV

*Preparation of d-2-formyl-3-(2'-formylethyl)-1-methylcyclopentane (V)*

The cyclic acetal (VIII, 27 parts by weight) was hydrolyzed as described above but the refluxing time was increased to two hours. After working up by the usual procedure, the residue was fractionally distilled to yield as the first main fraction the cyclic dialdehyde (V) in the form of a pale yellow liquid (7.55 parts by weight), B.P. 78–82°/0.4 mm., which had a characteristic, sweet odor; a freshly distilled sample had $[\alpha]_D^{26}$ −3.65° (c., 1.23 in $CCl_4$); 24 hours later the same sample had $[\alpha]_D^{26}$ +3.65°. (Found: C, 70.9; H, 9.3. $C_{10}H_{16}O_2$ requires C, 71.4; H, 9.5%.) The infrared spectrum had bands at 3.70 (aldehydic C—H) and 5.82μ (C=O). The second main fraction (7.2 parts by weight) consisted of the aliphatic dialdehyde (XI) described above.

The bis-2,4-dinitrophenylhydrazone of the cyclic dialdehyde (V) was prepared with Brady's reagent and separated from ethyl acetate-ethanol as orange prisms, M.P. 225–227°. (Found: C, 49.9; H, 4.7; N, 21.2. $C_{22}H_{24}O_8N_8$ requires C, 50.0; H, 4.5; N, 21.2%.)

The bis-semicarbazone formed colorless needles from methanol, M.P. 197–198° (decomp.). (Found: C, 51.0; H, 7.7; N, 30.1. $C_{12}H_{22}O_2N_6$ requires C, 51.1; H, 7.8; N, 29.8%.)

EXAMPLE V

*Preparation of d(+)-isoiridomyrmecin (IV)*

(a) *From the aliphatic dialdehyde (XI) by Michael condensation.*—Anhydrous methanol (50 parts by volume) was added at room temperature to d(+)-2,6-dimethyloct-2-en-1,8-dial (11 parts by weight) under nitrogen, followed after one hour by 10% methanolic sodium methoxide (5 parts by volume). After 16 hours at room temperature the brownish solution was refluxed on the water bath for 8 hours and finally left to cool over night. The solution was then chilled in an ice bath, acidified with dilute hydrochloric acid, poured into brine and thoroughly extracted with ether. The acidic organic extract was kept for 8 hours (to allow complete lactonization), freed from acidic material by means of aqueous sodium hydrogen carbonate, washed and dried. Evaporation of the solvent left a brown, mobile oil (10.3 parts by weight) which was warmed for one hour with N-sodium hydroxide solution (200 parts by volume) under nitrogen; undissolved material was collected in ether and the aqueous alkaline solution acidified, extracted with ether and the ethereal extract worked up as above. Fractional distillation yielded a mixture of isomeric lactones as a colorless, mobile oil (4.85 parts by weight), B.P. 87–90°/0.2 mm. $[X]^{22}$ −39° (c., 1.048 in $CCl_4$); this material had a characteristic, pleasantly sweet odor. (Found: C, 71.4; H, 9.5. $C_{10}H_{16}O_2$ requires C, 71.4; H, 9.5%.) The infrared spectrum had the carbonyl frequency at 5.76μ.

A portion of this mixture (1.9 parts by weight) was dissolved in warm 2 N-potassium hydroxide solution (26 parts by volume), chilled in ice and 50% aqueous acetic acid (21 parts by volume) was added dropwise with swirling. The colorless precipitate was collected, washed rapidly with a little ether and shaken with 5 N-hydrochloric acid in the presence of ether. The organic layer was washed with aqueous sodium hydrogen carbonate and water, dried and evaporated. Two crystallizations of the solid residue (0.79 part by weight) from light petroleum (B.P. <40°) gave d(+)-isoiridomyrmecin (0.36 part by weight) as beautiful, colorless prisms, M.P. 58.5–59°, $[\alpha]_D^{26}$ +56° (c., 1.41 in $CCl_4$). (Found: C, 71.8; H, 9.8. $C_{10}H_{16}O_2$ requires C, 71.4; H, 9.5%.) The infrared spectrum showed the carbonyl absorption at 5.76μ.

(b) *From the alicyclic dialdehyde (V).*—2-formyl-3-(2'-formylethyl) - 1 - methylcyclopentane (7.1 parts by weight) was warmed for one hour with N-sodium hydroxide solution (100 parts by volume) under nitrogen. Undissolved material (0.44 part by weight) was extracted with ether, and the aqueous layer cooled in ice and cautiously acidified with 5 N-hydrochloric acid (20 parts by volume). The colorless precipitate was washed with light petroleum, suspended in ether and shaken with 5 N-hydrochloric acid. The ethereal solution was worked up as described in section (a) to yield a colorless oil (2.52 parts by weight) which partly solidified at room temperature. Repeated crystallizations from light petroleum yielded the lactone (IV) as elongated prisms (1.03 parts by weight), M.P. 56–57°, undepressed with the previously prepared material. The hydrazide had, after crystallization from benzene, M.P. 118–119°. (Found: C, 59.8; H, 10.2; N, 13.8. $C_{10}H_{20}O_2N_2$ requires C, 60.0; H, 10.0; N, 14.0%.)

EXAMPLE VI

*Preparation of 2,6-dimethyloct-2-en-1,8-diol (XV)*

To a mixture of citronellyl acetate (150 parts by weight), acetic anhydride (112 parts by volume) and acetic acid (76 parts by volume), stirred at 90–100° was added freshly sublimed selenium dioxide (28 parts by weight) in small portions. The temperature was maintained at 120° overnight and finally raised to 150° for 7 hours. The acetic acid and anhydride were distilled at 15 mm., and the residue dissolved in ether, washed with water, sodium hydrogen carbonate solution and water, and dried. On fractionation some citronellyl acetate (52.5 parts by weight) was recovered; the fraction, B.P. 83–100°/0.05 mm., consisting mainly of isomeric diacetates, was redistilled at 105–108°/0.15 mm. (51.7 parts by weight). (Found: C, 66.0; H, 9.3. $C_{14}H_{24}O_4$ requires C, 65.6; H, 9.4%.) The infrared spectrum had a strong band at $5.75\mu$ (OAc).

The above mixture of diacetates (51.7 parts by weight), potassium hydroxide (50 parts by weight), water (50 parts by volume) and ethanol (700 parts by volume) were heated on the water bath for 3 hours. The reaction mixture was poured into saturated brine, extracted with ether, dried and evaporated. The residue was fractionally distilled to give a fraction (10 parts by weight) B.P. 89–101°/0.05 mm., and a second fraction (13.5 parts by weight), B.P. 102–104°/0.03 mm., which was considered to be pure primary diol (XV). Only the second fraction was used for further preparations. (Found: C, 69.6; H, 11.6. $C_{10}H_{20}O_2$ requires C, 69.8; H, 11.7%.) The infrared spectrum had a band at $3.08\mu$ (OH).

*2,6-dimethyloct-2-en-1,8-dial* (XI).—To a slurry of chromium trioxide (18 parts by weight) in pyridine (180 parts by volume), stirred at 30°, was added dropwise the above primary diol (6 parts by weight) in pyridine (60 parts by volume). The mixture was kept for 24 hours, poured into saturated brine, and extracted with a large volume of ether. The ethereal extract was washed with water, 5% hydrochloric acid and brine, and dried. The dialdehyde (1.68 parts by weight) distilled at 78–82°/0.1 mm. (Found: C, 71.3; H, 9.7. Calculated for $C_{10}H_{16}O_2$: C, 71.4; H, 9.5%.) The infrared spectrum indicated that this material was structurally identical with the dialdehyde (XI) previously prepared from citronellal (see above).

The bis-2,4-dinitrophenylhydrazone was prepared in pyridine and crystallized from benzene as a yellow powder, M.P. 208–209°. (Found: C. 50.1; H, 4.7; N, 21.4. Calculated for $C_{22}H_{24}O_8N_8$: C, 50.0; H, 4.6; N, 21.2%.) The melting point of this derivative remained undepressed on admixture with a sample of the corresponding derivative previously prepared from $d(+)$-2,6-dimethyloct-2-en-1,8-dial.

EXAMPLE VII

*Preparation of 8-acetoxy-2-,6-dimethyloct-2-en-1-al (XVI)*

To citronellyl acetate (187.5 parts by weight) in alcohol (310 parts by volume), stirred at 60°, was added a solution of freshly sublimed selenium dioxide (105 parts by weight) in alcohol (600 parts by volume) over a period of 4 hours. The temperature was then raised to 100° for 24 hours, the reaction mixture cooled and filtered, and the alcohol evaporated under reduced pressure. The residual oil was dissolved in ether, washed with water and dried. On fractionation citronellyl acetate (48.4 parts by weight), B.P. 90–125°/0.4 mm. collected. This was stirred with sodium sulfite heptahydrate (420 parts by weight), sodium hydrogen carbonate (240 parts by weight) and water (2400 parts by volume) for 24 hours, and undisolved oil extracted with ether. The aqueous solution was saturated with salt, basified strongly with caustic soda, extracted thoroughly with ether, and the ethereal extract washed with saturated brine and dried. On distillation of the residue 8-acetoxy-2,6-dimethyloct-2-en-1-al (40 parts by weight) was obtained as a colorless oil, B.P. 92–94°/0.1 mm. (Found: C, 68.0; H, 9.3. $C_{12}H_{20}O_3$ requires C, 68.0; H, 9.5%.) The infared spectrum indicated the presence of conjugated and unconjugated carbonyl groups.

EXAMPLE VIII

*Preparation of 2,6-dimethyl-8-hydroxyoct-2-en-1-al (XVII)*

The above acetate (2.1 parts by weight) was treated with saturated alcoholic ammonium (200 parts by volume) for 4 days at room temperature. The reaction mixture was diluted with water, extracted with ether, and the ethereal extract dried and evaporated. The product was evaporatively distilled, B.P. 140–150°/0.04 mm. (bath temperature) (0.54 part by weight). (Found: C, 70.0; H, 10.1. $C_{10}H_{18}O_2$ requires C, 70.6; H, 10.6%.) The infrared spectrum had peaks at 2.9 (OH), 3.7 (aldehydic C—H) and $5.94\mu$ (conjugated C=O).

The 2,4-dinitrophenylhydrazone was prepared in pyridine and crystallized from ethanol as an orange powder, M.P. 112.5°. (Found: C, 54.9; H, 6.5; N, 16.0. $C_{16}H_{22}O_5N_4$ requires C, 54.9; H, 6.3; N, 16.0%.)

Oxidation of the compound (XVII) with the chromium trioxide-pyridine complex in the manner described previously yielded the dialdehyde (XI), which was identified as the 2,4-dinitrophenylhydrazone and by the infrared spectrum.

2,6-dimethyl-8-hydroxyoct-2-en-1-al (XVII) was also prepared by direct oxidation of citronellol (156 parts by weight) in ethanol (300 parts by volume) with a solution of selenium dioxide (111 parts by weight) in alcohol (630 parts by volume) as described above for the corresponding acetate. Fractional distillation of the reaction products yielded unchanged citronellol (37 parts by weight) and a fraction (68 parts by weight), B.P. 120–144°/1.5 mm. This was stirred with sodium sulfite heptahydrate (350 parts by weight), sodium hydrogen carbonate (199 parts by weight) and water (1,990 parts by volume) as described previously. The product (26.2 parts by weight) isolated in this manner was identical with the aldehyde-alcohol (XXI) prepared from citronellyl acetate (infrared spectrum and 2,4-dinitrophenylhydrazone).

We claim as our invention:
1. A stereoisomer having the structural formula

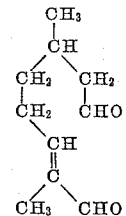

2. A process for the preparation of 2,6-dimethyloct-2-en-1,8-dial comprising oxidizing 2,6-dimethyloct-2-en-1,8-diol with chromium trioxide in pyridine.

References Cited in the file of this patent
FOREIGN PATENTS 546,375    Canada _____ Sept. 17, 1957

OTHER REFERENCES

Cavill et al.: Chemistry and Industry, June 2, 1956, p. 465.

Cavill et al.: Australian J. of Chemistry, vol. 9, No. 2, May 1956, pages 288–293.

Simonsen: The Terpenes, vol. III (1952), pp. 115–116 and 122, 123.